United States Patent [19]
Eriksson et al.

[11] Patent Number: 5,375,026
[45] Date of Patent: Dec. 20, 1994

[54] METHOD AND DEVICE FOR PREVENTING OVERSTABILIZATION OF LONGITUDINAL DIFFERENTIAL PROTECTION IN CASE OF INTERNAL FAULT

[75] Inventors: Leif Eriksson, Sala; Murari M. Saha, Västerås, both of Sweden

[73] Assignee: Asea Brown Boveri AB, Västerås, Sweden

[21] Appl. No.: 998,725

[22] Filed: Dec. 30, 1992

[30] Foreign Application Priority Data
Feb. 12, 1992 [SE] Sweden .................. 9200406-8

[51] Int. Cl.[5] ............................................. H02H 3/32
[52] U.S. Cl. ........................................ 361/63; 361/65; 361/87
[58] Field of Search ................ 361/110, 63, 65, 84, 361/87, 82

[56] References Cited
U.S. PATENT DOCUMENTS

| | | | |
|---|---|---|---|
| 4,377,834 | 3/1983 | Eriksson et al. | 361/82 |
| 4,731,689 | 3/1988 | Nimmersjo et al. | 361/66 |
| 4,855,861 | 10/1988 | Bergman et al. | |
| 5,202,812 | 8/1993 | Shinoda et al. | 361/69 |

Primary Examiner—Todd E. DeBoer
Attorney, Agent, or Firm—Watson Cole Grindle & Watson

[57] ABSTRACT

A method and a device for preventing overstabilization of longitudinal differential protections in case of internal faults on power lines, which may take place when a fault situation, which is indicated as an external faults, is in reality an internal fault. The invention comprises criteria which finally provide information as to whether the longitudinal differential protection is to enter into operation. The criteria comprise level and directional determination of the currents which are measured in the terminals of the power lines, checking whether these have the same direction, and so on.

4 Claims, 3 Drawing Sheets

METHOD AND DEVICE FOR PREVENTING OVERSTABILIZATION OF LONGITUDINAL DIFFERENTIAL PROTECTION IN CASE OF INTERNAL FAULT

TECHNICAL FIELD

A differential protection is a type of protection used for preventing damage which may arise in connection with internal faults on busbars, generators, motors, transformers, power lines, etc.

The requirements on the protection are somewhat different depending on the object to be protected. An unjustified protective function must be prevented and this can be done by stabilizing the protection. This means that attempts are made to make the protection unsusceptible to certain internal and external electrical transients and to external electrical faults. It is necessary, for example, to prevent that inrush current surges, overmagnetization currents, continuous currents, saturation of current transformers, etc., lead to an unjustified protective function.

The present invention relates to a special stabilizing problem which may arise when the differential protection is to protect against internal faults on power lines. Within the technical field in question, such a differential protection is referred to as a longitudinal differential protection.

BACKGROUND ART, THE PROBLEMS

Figure 1:
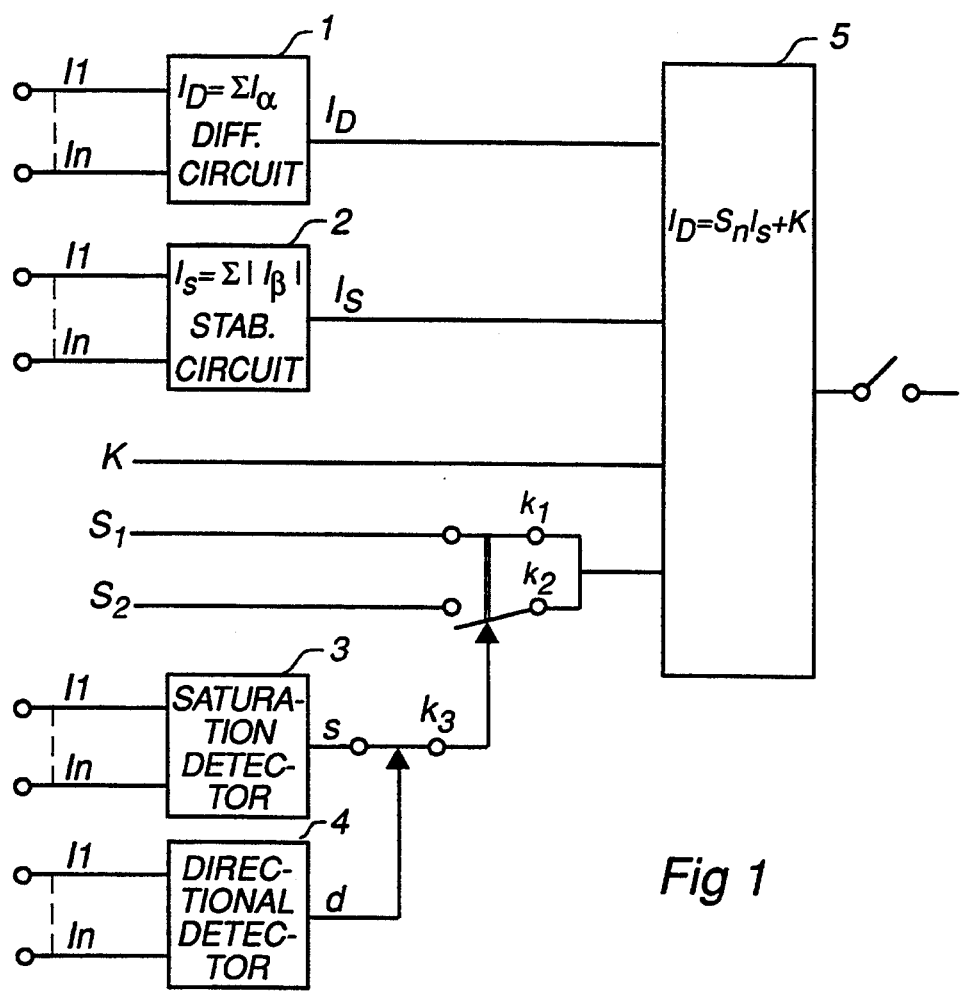
FIG. 1 is a summary of the principle disclosed in the prior art concerning stabilization of a longitudinal differential protection.

A differential protection is a type of protection which by means of current transformers measures and via a differential connection compares incoming and outgoing current in the protective object. The intention is that, when a differential current arises which exceeds a set value, which shall normally indicate that a fault has arisen in the protective object, then the protection is to become activated. As mentioned, however, certain electrical transients both in the protective object and outside the protective object, as well as external electrical faults, may influence the protective function in such a way that the protection interprets the transient or the fault as a fault in the protective object and activates the protection. To prevent this, the protection is stabilized.

Differential protections are often designed such that two different circuits can be distinguished, namely, a differential circuit and a stabilizing circuit. The protection functions such that the difference current, $I_D$, which in case of an internal fault arises between incoming and outgoing currents, can be separated with the aid of the differential protection.

The current which is used to stabilize the protection, $I_S$, emanates in some way from the Stabilizing circuit and it may be different for different protections, depending on what is to be stabilized against and on the technique used as well as the design of the protection in other respects. For example, the stabilizing current may be a reflection of the incoming current, obtained by means of a current transformer, for busbars, for example, the sum of reflected incoming currents, any of its components, or the like.

The function characteristic of a differential protection constitutes a graphic representation of the differential current as a function of stabilizing current, degree of stabilization S and function margin K, which is often expressed as $$I_D = S \cdot I_S + K$$

An example of the prior art regarding differential circuit and stabilizing circuit is described in SE 338 093, which relates to a differential protection for busbars. Here, incoming and outgoing currents are compared in accordance with the differential protection principle. Via a resistance combination in a stabilizing circuit, the reflected currents give rise to a stabilizing voltage which, in case of current identity between incoming and outgoing currents, stabilizes the protection and prevents unjustified operation. In case of current difference, a differential current is formed which, via a resistance combination in the differential circuit, provides a differential voltage. When this voltage, with a certain margin, becomes greater than the stabilizing voltage, the protection enters into operation.

SE 379 260 describes a longitudinal differential protection for a power line with two or more connected terminals. The protection in each one of the terminals comprises an output relay, a circuit which provides a stabilizing voltage and a differential circuit which provides a voltage in a tripping direction. Both the stabilizing circuit and the differential circuit consist of linear resistors. Otherwise, the sum of the currents arising in the differential circuits of all the terminals is equal to the sum of the product of the stabilizing degree of the protection and the sum of the magnitudes of all the incoming currents, as well as a constant which depends substantially on the functional value of the above-mentioned output relay, that is, a direct parallel to the function characteristic of a differential protection according to the above.

U.S. Pat. No. 4,855,861 describes a longitudinal differential protection based on the use of numerical technique and computer-controlled systems. To be able to determine if there is a fault within any line zone, also in this case it is a question of studying two situations, namely, whether all the currents are directed out from or inwards towards the relevant zone. In these two cases a fault is located within the relevant zone.

Known problems in connection with differential protections is that they exhibit deficiencies as regards the stability in case of external faults and in case of networks with a large short-circuit power. In addition, false difference currents may arise in case of external faults owing to the fact that some of the current transformers becomes saturated. However, current transformer saturation may be detected in accordance with several known methods (see, inter alia, SE 9100917-5). Information that saturation has occurred may be used for stabilization of a differential protection, which, however, entails a certain risk of overstabilization in case of an internal fault.

A power line network may be fed from several voltage sources and, therefore, a longitudinal differential protection must receive current information from a corresponding number of terminals. A method for determining the direction to a fault which is based on a comparison of the polarity of the currents in the terminals is described in an article "Elektronischer Sammelschienenschutz", published in Brown Boveri Mitt., 1966, No. 4/5, pages 3–16. This method can be used to avoid overstabilization if the polarity of the currents is such that all the currents flow towards an internal fault in the line network.

A summary of the principle disclosed in the prior art regarding stabilization of longitudinal differential protections, as it has been described, is given in FIG. 1. The terminal currents $I_1$ and $I_n$ are conducted to a differential circuit 1, to a stabilizing circuit 2, to a current transformer saturation detector 3 as well as to a current directional detector 4. From the differential circuit there is obtained a differential current $I_D = \epsilon I_\alpha$ with $\alpha = 1 \ldots n$, from the stabilizing circuit there is obtained a stabilizing current $I_S = \epsilon |I_\beta|$ with $\beta = 1 \ldots n$, from the saturation detector there is obtained a signal "s" when any of the current transformers becomes saturated, and from the directional detector there is obtained a signal "d" when the terminal currents have the same direction, that is, when it is a question of an internal fault. To the function unit 5 of the longitudinal differential protection, which unit is to carry out the function characteristic $I_D = S \cdot I_S + K$, there are conducted the differential current $I_D$, the stabilizing current $I_S$, and, via a contact pair $k_1$ and $k_2$ adapted such that either the first or the second contact is closed, a value $S_1$ or $S_2$ of the stabilizing degree S which is dependent on the output signals of the saturation detector and the directional detector, as well as a value of the relay constant K. Which of the contacts $k_1$ and $k_2$ of the contact pair is connected is determined by a third contact $k_3$, the closed/open state of which is dependent on the output signal of the directional detector in such a way that it is opened only when the directional detector signals an internal fault.

The stabilization operates as follows: The contacts $k_1$ and $k_3$ are always closed in a normal and faultless state. The stabilizing degree $S_1$ is then part of the function characteristic. If the saturation detector signals saturation of any of the current transformers and no internal fault has been signalled, the stabilizing degree $S_1$ is disconnected and the stabilizing degree $S_2$ is connected in order to be part of the function characteristic. Irrespective of whether saturation has been signalled or not, however, the stabilizing degree of the function characteristic will return to $S_1$ when an internal fault has been signalled.

However, the described method according to the state of the art has the disadvantage that the directional information may be ambiguous, which can specially occur if the impedance between two terminals is lower via an external path than internally via an internal nodal point. To illustrate this, a number of fault situations will be analyzed.

Figure 2:
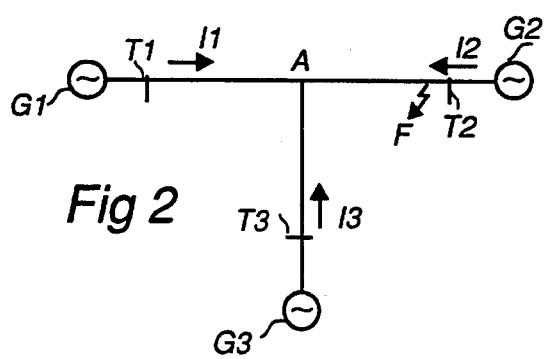
FIGS. 2, 3, 4 and 5 show different fault situations which may arise in a T-network.

A power transmission network connected according to FIG. 2, that is, in the form of a so-called T-network, with a nodal point at A, is supplied ! from three different voltage sources G1, G2 and G3 and is provided with one terminal at each line end at T1, T2 and T3. If a fault occurs at F on the line distance between T2 and the nodal point A, the currents which are recorded in the respective terminals, that is, I1, I2 and I3 will all be directed towards the location of the fault. The same current variation will occur independently of in which of the T-branches a fault occurs. Also if any of the current transformers of the terminals would become saturated, the currents in case of a fault in any of the T-branches between the terminals will exhibit the same current direction. Such a fault is clearly and unambiguously an internal fault and the longitudinal differential protection is to enter into operation.

Figure 3:
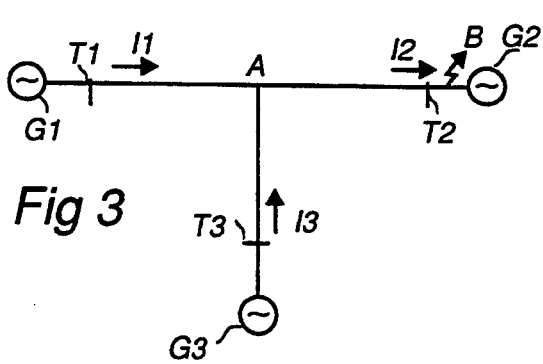

If a fault B occurs in a power network according to FIG. 3 between the terminal T2 and the supply source G2, the current I2 will be oppositely directed relative to the currents I1 and I3. This is therefore a criterion of an external fault according to the prior art and none of the longitudinal differential protections in the three terminals is to enter into operation. The direction of the current is, of course, independent of whether any of the current transformers becomes saturated.

Figure 4:
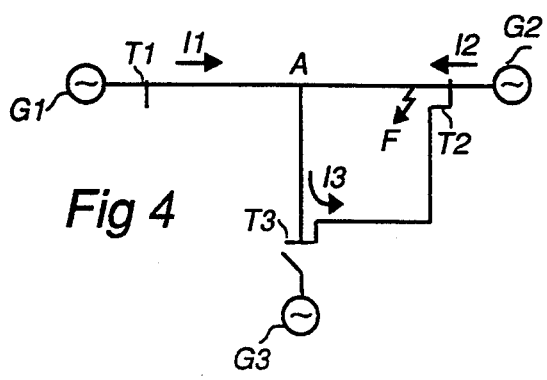

If the power transmission network has a line connected in parallel between terminals T2 and T3 and the supply from G3 is small or insignificant while at the same time a fault F occurs relatively near the terminal T2, however between T2 and the nodal point A, that is, a situation according to FIG. 4, the current I3 flows in the opposite direction relative to the currents I1 and I2. With known criteria for an external and an internal fault, respectively, this fault is an external fault for which the longitudinal differential protections are to be stabilized, although in reality it is an internal fault. This means that the longitudinal differential protections are overstabilized for such a fault situation.

Figure 5:
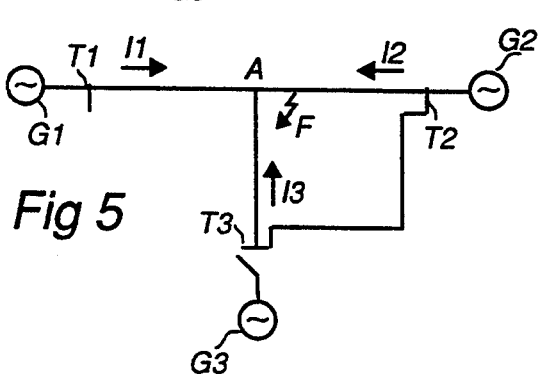

If, using the same network configuration, a fault occurs between the terminal T2 and the nodal point A, however at a point further along the line counting from T2 (see FIG. 5), all the terminal currents Will be directed in the same direction. The fault situation! will therefore be identified as an internal fault and the longitudinal differential protections enter into operation.

The ambiguity regarding the function of a longitudinal differential protection depending on the location of the fault, which is clear from the above, is a problem as such and may lead to overstabilization in case of an internal fault and entail serious consequences.

SUMMARY OF THE INVENTION

A method and a device according to the invention constitute a supplementation of the method and the device for stabilization of a longitudinal differential protection according to the prior art. This supplementation eliminates the risk of overstabilization in case of an internal fault, due to the ambiguity which may arise in certain situations, as described above, regarding the determination as to whether a fault is an external fault or an internal fault. If it is a question of an external fault, a longitudinal differential protection is to be stabilized for this, that is, the protection shall not enter into operation. As described above, certain situations may arise where, according to the current direction criterion, it appears to be a question of an external fault whereas in reality it is an internal fault, which is not to be stabilized. When, according to the criteria of the invention, it is determined that a fault which is interpreted as an external fault in reality is an internal fault, the stabilization actions are to be disconnected, whereby the protection can enter into operation.

A simple fault situation is always connected with a current increase. It is suitable to take into account only those currents of the terminals which exceed a certain minimum fault current level, k·$I_r$, where $I_r$ is the rated current of the terminals. In this way the advantage is obtained that terminals which provide a small or no contribution to the fault current, and which hence reasonably have a somewhat more uncertain possibility of a correct current direction determination, are excluded from further processing in the stabilization process. On the other hand, the value of k must be selected lower than the greatest current that may be measured without current transformer saturation occurring.

To sum up, the supplementation comprises the following steps:

checking by means of a first criterion whether at least two of the terminal currents have a value greater than k·$I_r$ and then determining the current direction for these currents, and checking by means of a second criterion whether the current directions are different, and if the fault situation is interpreted as an external fault, finding out the level $I_B$ of that terminal current which has a direction opposite to that of the other terminal currents, and also finding out the level $I_A$ of the greatest of the other currents, and checking by means of a third criterion whether $I_B$ is smaller than a certain part of $I_A$. If this is the case, the fault situation is interpreted as an internal fault which is to be acted upon. In the opposite case, the fault situation is interpreted as an external fault for which the longitudinal differential protection is not to be stabilized.

What distinguishes the invention from the prior art is, thus, that instead of only directional detection according to 4 in FIG. 1, a supplementation has been introduced which comprises a number of criteria which include level detection, directional detection, control of current direction, maximum value determination, and a relative comparison between the terminal currents. When the supplementation device signals an internal fault, this signal shall replace the signal "d" in FIG. 1 and disconnect a possible saturation signal "s", whereby the stabilizing degree S1 will be the one that determines the function characteristic.

DESCRIPTION OF THE PREFERRED EMBODIMENTS

The supplementation of the existing stabilization measures, as described under the summary of the invention, means that that part which comprises the directional detection 4 according to FIG. 1 is replaced by a number of criteria which, however, comprise, inter alia, a directional detection. A supplementation device for carrying out the described method according to the invention may have a plurality of different embodiments built up of analog and/or digital components which together may constitute a more or less integrated design.

An embodiment KA of the supplementation device according to the invention will be described in greater detail with reference to a combined flow chart and block diagram according to FIG. 6.

All the terminal currents are conducted to a level detector unit and a first selector 6 for deciding upon the first criterion. If at least two of the terminal currents have a value which is greater than k·$I_r$, according to this criterion a fault situation exists. If this is the case, a separation of positive and negative currents for each half-cycle takes place in a separation unit 7, that is, a determination of the current direction for the two or more currents which are produced from the first criterion.

The information about the current directions is input information to a second selector 8 for determination of the direction, which determination constitutes the second criterion of the supplementation. Here it is asked whether the current directions are different. If the current directions are not different, the fault situation is an internal fault which is to be acted upon in the usual way according to the state of the art, that is, the stabilizing degree $S_1$ according to FIG. 1 is to be determining for the function characteristic.

If any of the terminal currents has a current direction opposite to that of the other terminal currents, that is, that it would entail an external fault according to the state of the art, the supplementation according to the invention comprising first finding out, in a level determination unit 9, the level $I_B$ of that terminal current which has the opposite direction and also finding out the level $I_A$ of the greatest of the other terminal currents. Further, the supplementation comprises utilizing this information to find out, as the third criterion in a third selector 10, if the level $I_B$ of the terminal current which has an opposite direction is lower than a certain part "f" of the level of the greatest of the other terminal currents, that is, if $|I_B| < f \cdot |I_A|$. The value of "f" is selected to correspond to the current distribution at the nodal point nearest the terminal which has a deviating current direction. The current distribution is dependent on the geographical conditions and the impedances of the power network and will normally be between 0.25 and 0.5. If the answer is YES, that is, when the supplementation device 11 interprets the fault situation as an internal fault, a signal "i" is obtained which is to replace the signal "d" according to FIG. 1. If the answer is NO, the fault situation is to be interpreted as an external fault, and the stabilizing degree $S_2$ according to the prior art and FIG. 1 is to be connected into the function unit 5.

Figure 6:
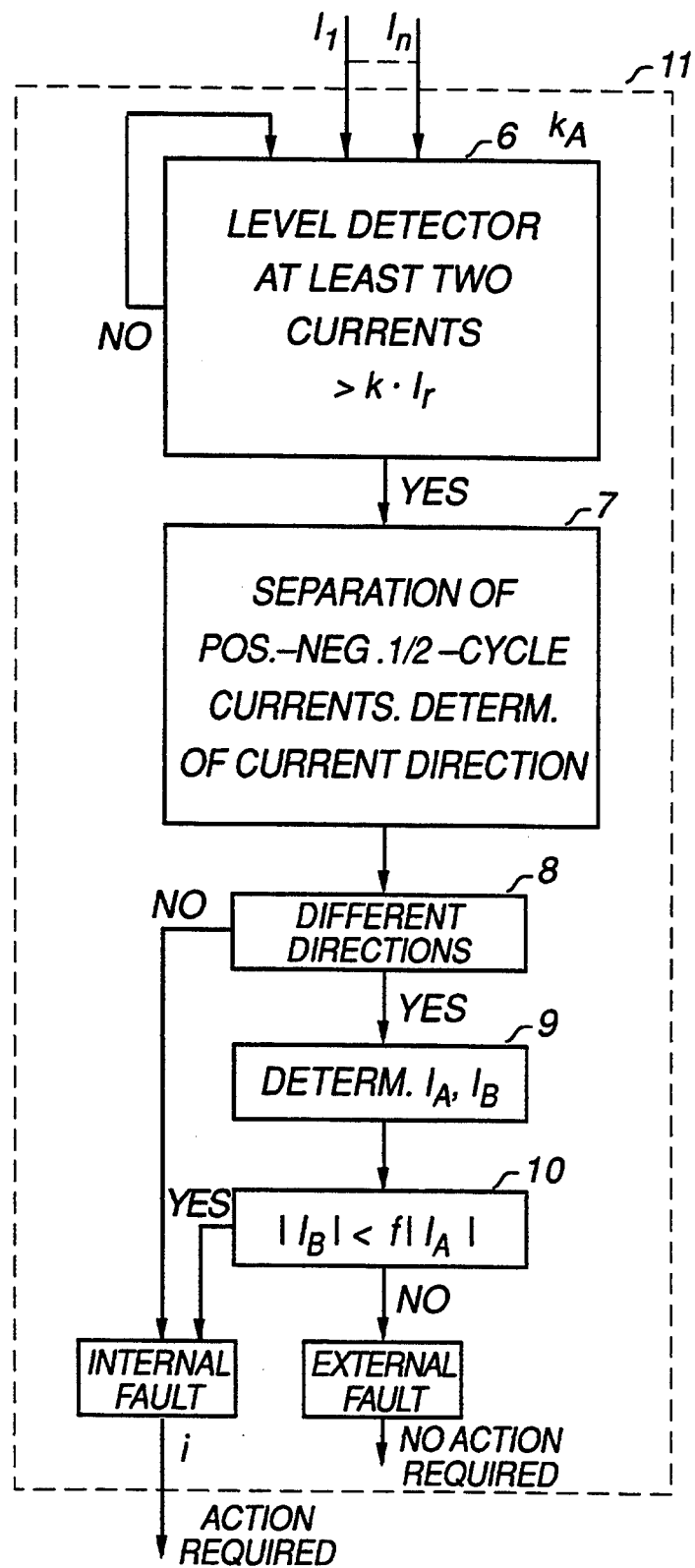
FIG. 6 shows a combined flow chart and block diagram according to the invention fore, supplementation of the stabilization measures for a longitudinal differential protection.
Figure 7:
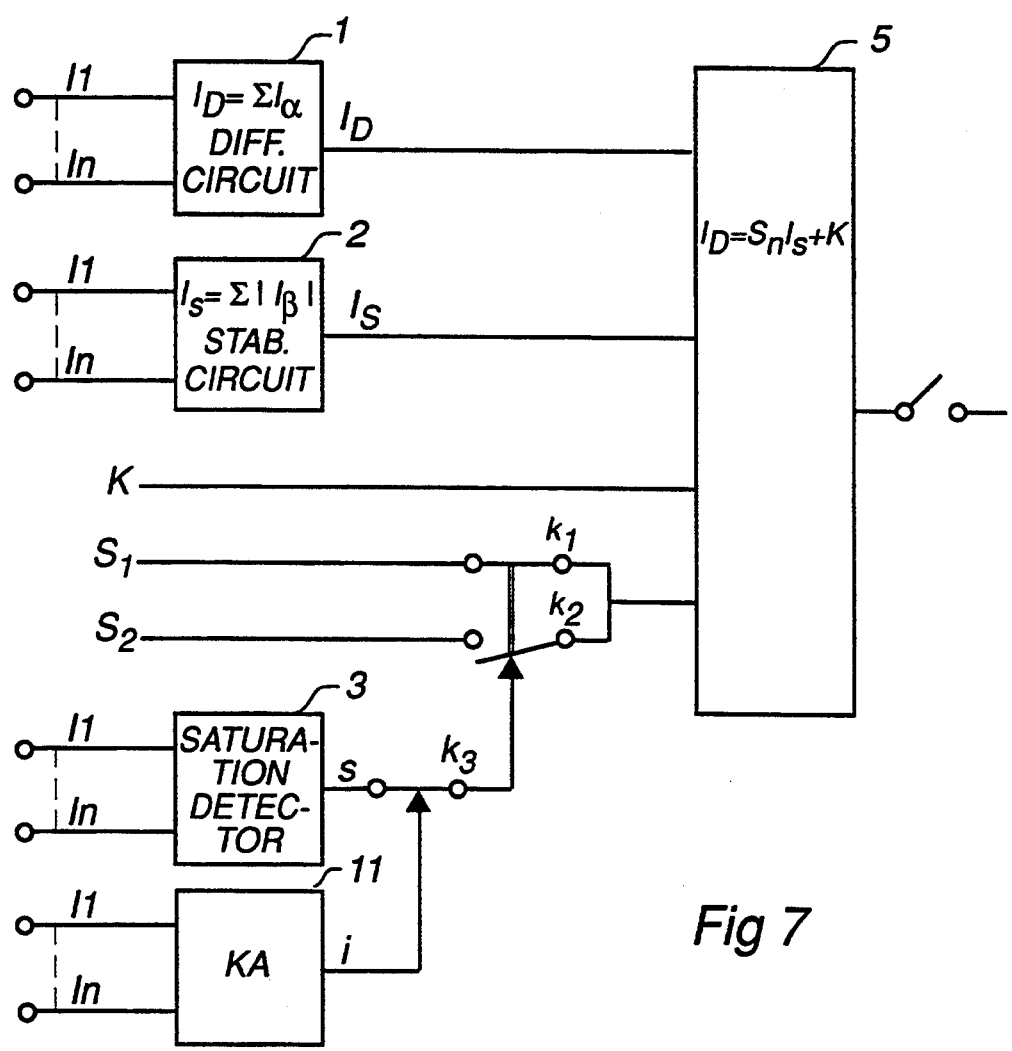
FIG. 7 shows how the supplementation constitutes part of the stabilization measures of the longitudinal differential protection.

FIG. 7 shows how the supplementation device 11, KA, according to FIG. 6 is integrated into the other stabilization measures by replacing the directional detection 4 according to FIG. 1. When, according to the invention, an internal fault is signalled, a possible signal "s" indicating a saturated transformer is to be disconnected in the usual way according to the prior art, and the stabilizing degree $S_1$ according to FIG. 1 is to be determining for the function characteristic.

In a preferred embodiment, tile following is set: k=1.5 and 5=0.5.

In an embodiment used in practice, the supplementation device comprises input interface with analog-to-digital conversion, filters, etc.

We claim:

1. A method for preventing overstabilization of longitudinal differential protections in case of internal faults on power lines which are each provided with a terminal with rated current $I_r$, where the terminal current in question is measured and the values I1, .... In of all terminal currents are supplied for the longitudinal differential protection, and which uses three criteria which together determine whether a fault situation is to be interpreted as an internal fault, comprising the steps of: determining that a first criterion is fulfilled when at least two of the terminal currents, the value of which is continuously sensed by a level detector, have a value which exceeds a minimum fault current level k-$I_r$ and including the step of determining the direction of said terminal currents, a second criterion comprising the step of checking if the fault situation is interpreted as an external fault because the directions of said terminal currents are different, and, if this is true, determining the level $I_B$ of the terminal current which has a direction opposite to that of the other terminal currents as well as the level $I_A$ of the greatest of the other terminal currents, and a third criterion comprising determining whether $|I_B| < f \cdot |I_A|$ and, if this is true, the fault situation is to be interpreted as an internal fault.

2. A method for preventing overstabilization of longitudinal differential protections in case of internal faults on power lines according to claim 1 and wherein the factor "f" in the smallest fault current level $k \cdot I_r$ is set at 1.5 and that the factor "f" in the inequality $I_B < f \cdot |I_A|$ is set to 0.5.

3. A device for preventing overstabilization of longitudinal differential protections in case of internal faults on power lines which are each provided with a terminal with rated current $I_{r9}$, for measuring the terminal current in question, and where the values I1, .... In of all terminal currents are input quantities to the longitudinal differential protection, the device comprising:

a level detector and a first selector for determining whether at least two of the terminal currents have a value which exceeds a minimum fault current level k $I_r$ and, if this is true, a separation and direction determining unit determines the direction of said currents by means of separation of the positive and negative half-cycles of said currents, a second selector determines whether the current directions are different and, if this is true, a level determination unit determines the level $I_B$ of the terminal current, which has a direction opposite to the directions of the other terminal currents, as well as determines the level $I_A$ of the greatest of the other terminal currents, and a third selector determines whether $|I_B| < f \cdot |I_A|$ and, if this is true, the fault situation is interpreted as an internal fault, and means for delivering an action signal "i" in response thereto.

4. A device for preventing overstabilization of longitudinal differential protections in case of internal faults on power lines according to claim 3, characterized in that the smallest fault current level is set at 1.5 and that the factor "f" in the inequality $|I_B| < f \cdot |I_A|$ is set at 0.5.

* * * * *